United States Patent [19]

Hattori et al.

[11] Patent Number: 4,698,050
[45] Date of Patent: Oct. 6, 1987

[54] LAMINATED METALLIC BELT FOR TORQUE TRANSMISSION DEVICE AND METHOD OF MANUFACTURE THEREOF

[75] Inventors: Torao Hattori, Saitama; Yasushi Takagi, Kanagawa; Akira Tange, Kanagawa; Chiharu Umetsu, Kanagawa; Osamu Kudo, Kanagawa; Kiyoshi Kurimoto, Kanagawa; Rou Kitamura, Kanagawa, all of Japan

[73] Assignees: Honda Giken Kogyo, K.K.; NHK Spring Co., Ltd., both of Tokyo, Japan

[21] Appl. No.: 860,592

[22] Filed: May 7, 1986

[30] Foreign Application Priority Data

May 18, 1985 [JP] Japan ................................ 60-106761

[51] Int. Cl.$^4$ ................................................ F16G 5/16
[52] U.S. Cl. .................................... 474/242; 474/201
[58] Field of Search ............ 474/242, 260, 264, 268, 474/272; 427/304, 284, 438, 38; 156/137

[56] References Cited

U.S. PATENT DOCUMENTS

| | | | |
|---|---|---|---|
| 4,262,044 | 4/1981 | Kuczma, Jr. ........................ | 427/438 |
| 4,402,994 | 9/1983 | Kobayashi et al. .................. | 427/38 |
| 4,457,742 | 7/1984 | Hattori et al. ...................... | 474/242 X |
| 4,483,711 | 11/1984 | Harbulak et al. ................... | 427/438 X |
| 4,486,247 | 12/1984 | Ecer et al. ......................... | 427/38 X |
| 4,532,149 | 7/1985 | McHargue ........................... | 427/38 |
| 4,552,548 | 11/1985 | Hattori ............................... | 474/201 |

Primary Examiner—Stephen J. Novosad
Assistant Examiner—Thuy M. Bui
Attorney, Agent, or Firm—Alan H. MacPherson; Paul J. Winters; Richard Franklin

[57] ABSTRACT

Disclosed is an improved laminated metallic belt consisting of at least two layers of an endless metallic band for use in a torque transmission device, which can transmit torque between two pulleys having variable effective radii, in combination with a plurality of metallic blocks which have surfaces contacting the innermost layer of the laminated metallic belt and are arranged along the laminated metallic belt. The metallic belt according to the present invention may be made of precipitation hardening martensitic stainless steel or maraging steel which have favorable properties as to toughness, mechanical strength and the adaptability for welding required for making an endless laminated metallic belt, but lack the surface hardness to ensure relatively favorable durability. The durability of the steel is improved according to the present invention by a nitride layer and/or an electroless nickel plating layer formed on the side edges of the endless metallic band. Optionally, the innermost and/or the outermost surface of the laminated metallic belt may be hardened in a similar manner.

16 Claims, 6 Drawing Figures

LAMINATED METALLIC BELT FOR TORQUE TRANSMISSION DEVICE AND METHOD OF MANUFACTURE THEREOF

TECHNICAL FIELD

The present invention relates to a metallic belt for a torque transmission device such as a continuously variable transmission device and in particular to a laminated metallic belt which forms part of such a metallic belt in combination with metallic blocks attached thereto and a method of manufacturing such a laminated metallic belt.

BACKGROUND OF THE INVENTION

According to a known continuously variable transmission device using a pair of pulleys and an endless V-belt, each pulley comprises a pair of members having coaxial and mutually opposing conical surfaces which are supported opposite to each other in a mutally axially slidable manner so as to define a V-groove whose width can be varied by relative axial motion of the two members. By thus varying the effective radius of the two pulleys in a corresponding manner, torque or rotational power can be transmitted between the two pulleys by the endless V-belt at a continuously variable transmission ratio.

In such a continuously variable transmission device, the endless V-belt is subjected to both repeated flexing and considerable tension as it travels between the two pulleys, and, in order to assure power transmission efficiency and reliability, the V-belt must be both flexible and durable. V-belts using synthetic resin, leather and other flexible materials may be sufficiently flexible for efficient power transmission but will wear out in a relatively short time when the power to be transmitted is great. Metallic links such as chains could be used for such a V-belt, but the lack of flexibility and the uneven contact between the belt and the pulleys would give rise to the problems of low power transmission efficiency and noise.

Japanese Patent Application No. 58-70920 (Japanese Patent Laying-Open Publication No. 59-197641) filed by one of the Assignees of the present application proposes a continuously variable transmission device which uses an endless V-belt comprising a plurality of blocks having a V-shaped cross-section and a laminated metallic belt which is passed through the blocks and formed into a loop. Since the laminated metallic belt is sufficiently flexible to assure high power transmission efficiency and has a sufficient tensile strength to endure the tension applied thereto in transmitting power while the metallic blocks assure uniform contact between the V-belt and the pulleys and can transmit compressive force by their mutual contact, very favorable overall results can be obtained. However, it has been found that when such a continuously variable transmission device is subjected to severe load conditions for an extended time period, the laminated metallic belt tends to suffer uneven wear, particularly along the side edges.

The metallic tape or band used for forming such a laminated belt is required to be extremely thin, on the order of 0.1 mm to 0.2 mm, in order to be sufficiently durable against repeated bending stress, to be flexible, and contains a sufficient number of layers to endure the tensile stress. The material for such a metallic band is selected from quenched and annealed steel such as AISI 4340, precipitation hardening semi-austenitic stainless steel such as 17-7PH stainless steel, precipitation hardening martensitic stainless steel and maraging steel. The former two materials are relatively poor in toughness, while the latter two materials are relatively great in toughness and mechanical strength and are adapted to welding, but relatively poor in wear resistance.

The material for the metallic blocks is required to have high surface hardness and to be wear resistant since the blocks transmit torque by frictionally engaging with V-groove pulleys under severe load condition.

When a laminated metallic belt travels around the pulleys, relative velocity differences arise between the metallic band layers and between the laminated metallic belt and the metallic blocks, and the lateral side edges of the metallic band layers and the innermost layer of the metallic band are subjected to relative slips while receiving high surface pressure. The surface pressure tends to be high only because the metallic band is thin but also because the side edges of the metallic band are chamfered for the purpose of reducing stress concentrations in the corners. As a result, the lateral side edges of the metallic band tend to wear out faster than other areas and the durability of the metallic belt is impaired accordingly.

A nitriding process is well known as a means for improving the wear resistance and the fatigue resistance of metallic materials, but it is also known that if a nitriding process is attempted on an elongated member such as a metallic band for an endless laminated belt, problems arise because the dispersion of nitrogen in the metallic material causes dimensional increases and twisting deformation. Furthermore, a gas nitriding process will produce a brittle layer on the surface which must be removed by grinding. Tin plating and nickel plating may be used as an alternative to nitriding, but plating has the disadvantages of causing dimensional changes when performed on elongated thin band material. Plating is also costly.

BRIEF SUMMARY OF THE PRESENT INVENTION

In view of such problems of the prior art, a primary object of the present invention is to provide a laminated metallic belt, consisting of at least two layers of endless metallic band for use in a torque transmission device in combination with a plurality of metallic blocks which have surfaces contacting the innermost layer of the laminated metallic belt and are arranged along the laminated metallic belt, which is highly durable and adapted to efficient torque transmission.

Another object of the present invention is to provide a laminated metallic belt for a torque transmission device which is economical.

Yet another object of the present invention is to provide a laminated metallic belt for a torque transmission device which is easy to manufacture.

According to the present invention, such objects are accomplished by providing a laminated metallic belt consisting of at least two layers of endless metallic band for use in a torque transmission device in combination with a plurality of metallic blocks which have surfaces contacting the innermost layer of the laminated metallic belt and are arranged along the laminated metallic belt, wherein at least the side edges of the endless metallic band are hardened.

According to the broadest concept of the present invention, since the side edges of the endless metallic band which have a great tendency to wear are made more durable, the overall durability of the laminated metallic belt is improved.

According to one aspect of the present invention, since the hardening process comprises a nitriding process or an electroless nickel plating, the hardening process will not affect the toughness and mechanical strength of the metallic band.

According to another aspect of the present invention, since the endless metallic band consists of a material selected from precipitation hardening martensitic stainless steel and maraging steel, the laminated metallic belt will have sufficient toughness and mechanical strength and favorable workability particularly for welding.

According to yet another aspect of the present invention, since the innermost and/or the outermost layer of the metallic band which is also prone to wear is also hardened, the improvement in the durability of the laminated metallic belt is further enhanced.

BRIEF DESCRIPTION OF THE DRAWINGS

The present invention will now be shown and described in terms of the following concrete embodiments thereof with reference to the appended drawings, in which.

DETAILED DESCRIPTION OF THE PREFERRED EMBODIMENT(S)

Figure 1:
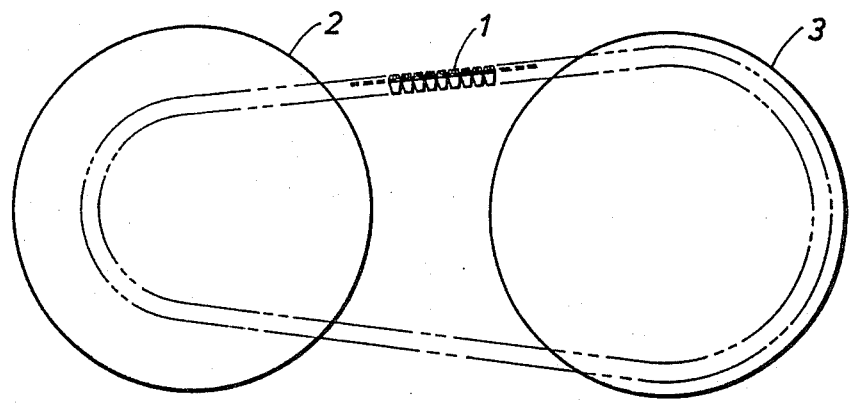
FIG. 1 is a general schematic side view of a typical continuously variable transmission device to which the laminated metallic belt of the present invention may be applied.
Figure 2:
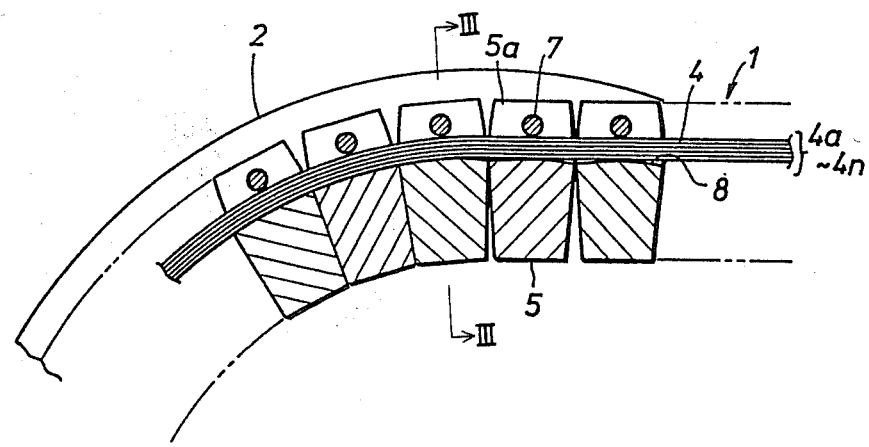
FIG. 2 is a sectional view of a first example of an endless metallic belt to which the laminated metallic belt of the present invention may be applied in combination with metallic blocks.
Figure 3:
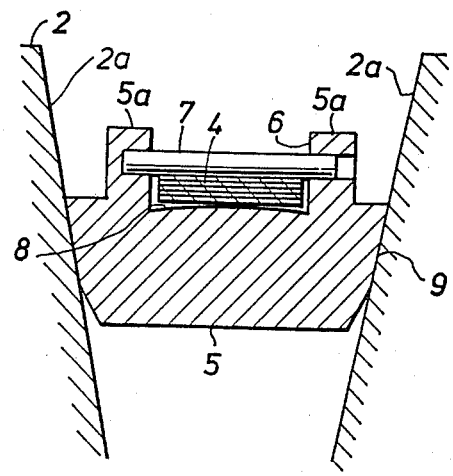
FIG. 3 is a sectional view taken along line III—III of FIG. 2.

FIGS. 1 to 3 show an endless metallic belt 1 passed around a pair of V-groove pulleys 2 and 3 to which this invention may be applied. As shown in FIGS. 2 and 3, an endless laminated metallic belt 4 made by laminating a plurality of endless metallic band layers 4a to 4n is received in a groove 6 defined between a pair of projections 5a integrally formed in the top surface of a metallic block 5. A pin 7 press fitted into holes provided in the two projections prevents the laminated metallic belt 4 from falling out of the groove 6. The bottom surface 8 of the groove 6 is slightly curved along the lateral direction thereof for centering the laminated metallic belt 4 in the groove 6 during the operation of the device according to the principles well know in the art of flat belt transmission.

A plurality of such metallic blocks 5 are arranged along the laminated metallic belt 4 substantially without any gaps between neighboring metallic blocks. The bottom surface 8 of the groove 6 is slightly curved along the longitudinal direction thereof to provide even contact between the laminated metallic belt and the bottom surface 8 of the groove 6 as shown in FIG. 2.

The lateral side surfaces of each metallic block 5 are inclined downwardly so as to be snugly received by the pulley grooves 2a of the V-groove pulleys 2.

Thus, the metallic blocks 5 are attached to the laminated metallic belt 4 but are freely moveable along the longitudinal direction of the laminated metallic belt 4. Therefore, as a driving force is transmitted from one of the pulleys 2 to the laminated metallic belt 4, the driving force is transmitted to the other pulley 3 mainly by way of the metallic blocks 5 as compressive pressure therebetween.

Figure 4:
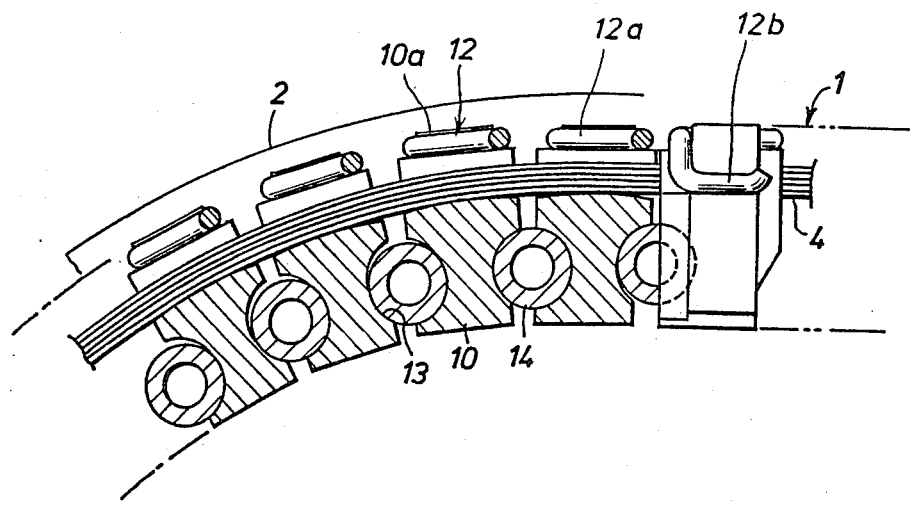
FIG. 4 is a sectional view of a second example of an endless metallic belt to which the laminated metallic belt of the present invention may be applied in combination with metallic blocks.
Figure 5:
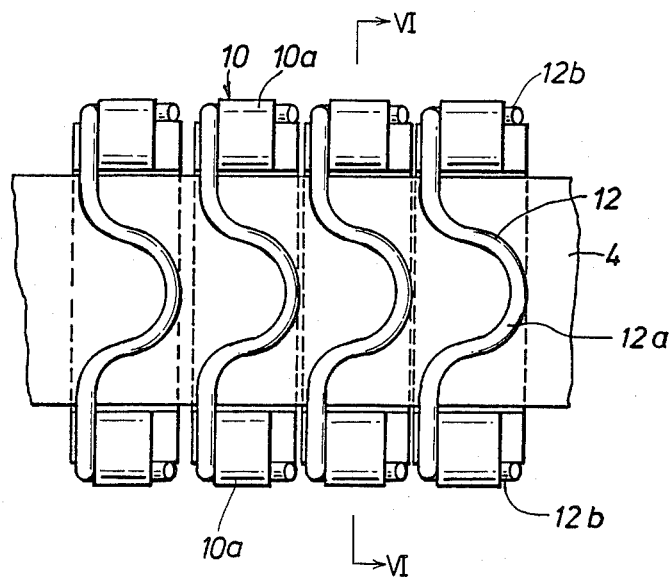
FIG. 5 is a plan view of the example shown in FIG. 3.
Figure 6:
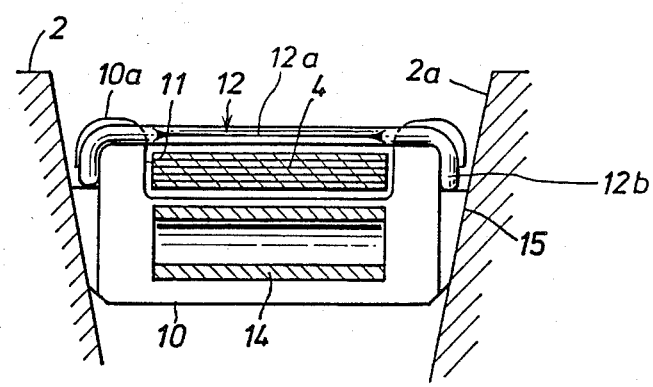
FIG. 6 is a sectional view taken along line VI—VI of FIG. 5.

FIGS. 4 to 6 show another metallic belt 1 to which the present invention may be applied. A laminated metallic belt 4 is received in a groove 11 defined between a pair of projections 10a which are integrally formed on the top surface of a metallic block 10 and held therein by a clip 12 which is bent in a three-dimensional manner. As shown in FIGS. 4 to 6, the clip 12 comprises a middle portion 12a which is curved in a plane parallel to the major surface of the laminated metallic belt 4 for even contact therewith, and end portions 12b which are downwardly bent in the shape of a letter L for engagement with the lower surfaces of undercut portions of the projections 10a.

The front and rear surfaces of each metallic block have depressions 13 which have arcuately curved bottom surfaces as best shown in FIG. 4, and roller members 14 are interposed between the neighboring metallic blocks 10 and received by these depressions 13. The roller members 14 may be elastically deformable so as to accommodate the impulsive forces which may act between the metallic blocks 10.

Thus, as the laminated metallic belt 4 undergoes bending deformation so as to negotiate the curvature of the pulleys 2 and 3, the curved bottom surfaces of the depressions 13 of the metallic blocks 10 roll over the outer circumferential surfaces of the roller members 14 whereby the metallic blocks 10 move in conformity with the deformation of the laminated metallic belt 4 without the neighboring metallic blocks 10 interfering with each other.

As best shown in FIG. 6, the metallic blocks 10 also have an inclined surface on both side surfaces 15 for even contact between the metallic blocks 10 and the internal lateral side surfaces of the pulley groove 2a.

In the above-described examples, the thickness of the metallic band layers 4a to 4n of the laminated metallic belt 4 is preferred to be on the order of 0.1 mm to 0.2 mm and the lateral side edges of the metallic band layers 4a to 4n are provided with nitride layers formed by an ion nitriding process. The thickness of the nitride layers is preferred to be on the order of 0.5 to 30 microns. If the thickness exceeds 30 microns, the rigidity of the nitride layer becomes excessive and cracks may develop when the belt passes over the pulleys or when the radius of curvature of the belt is reduced below a certain level. On the other hand, if the thickness of the nitride layer is less than 0.5 microns, the wear resistance thereof may not be sufficient for practical purposes.

The ion nitriding process may consist of accelerating nitrogen ions by glow discharge in a vacuum environment and impinging the nitrogen ions on to the material on which a nitride is to be deposited. Alternatively, it is possible to use salt bath and plasma processes for nitriding. In nitriding the lateral side edges of the metallic band layers 4a to 4n which are combined into a laminated metallic belt 4, it is possible to conduct the nitriding process by placing a pair of soft steel plates against the outermost surfaces and the innermost and laminated metallic belt and performing the above mentioned nitriding process on the exposed side surfaces of the metallic band layers 4a to 4n.

Optionally, it is possible to conduct a similar additional nitriding process to the outermost surface and/or the innermost surface of the laminated metallic belt. This may be conducted before hardening the side edges of the laminated metallic belt and the depth of the nitride layer should be on the order of 0.5 to 5 microns to ensure the toughness requirements, while the thickness of the nitride layer along the lateral side edges of the laminated metallic belt may be on the order of 0.5 to 50 microns. In order to compensate for the dimensional changes resulting from such a nitriding process, the metallic band of the innermost or outermost layer of the laminated metallic band may initially be provided with smaller dimensions. The surface hardened layer on the innermost and outermost surfaces of the metallic band will prevent wear which may otherwise occur due to the relative motion between the innermost or the outermost layer of the laminated metallic belt and the corresponding surfaces of the metallic blocks.

A nitride layer thus formed is so strongly attached to the base material and durable that the wear resistance of the base material can be much improved without compromising the original properties of the base material. The base material for the metallic band may be selected from precipitation hardening martensitic stainless steel, maraging steel and their equivalents which have sufficient mechanical strength and toughness and suitability for welding.

As an alternative process for improving the durability of a laminated metallic belt, it is also possible to form surface hardened layers on the lateral side edges of the metallic band layers by electroless nickel plating. Such an electroless nickel plating layer may extend from the two lateral side edges over the whole innermost surface of the laminated metallic belt and optionally over the whole outermost surface of the laminated metallic belt. This can be accomplished by conducting electroless plating to a fully assembled laminated metallic belt since the plating liquid can not reach the interfaces between neighboring layers of the laminated metallic belt.

Since an electroless nickel plating layer likewise has high hardness and strong attachment to the base material, it can produce a high surface hardness and provide the laminated metallic belt with high durability. The surface hardened layer on the innermost surface of the metallic band will prevent wear which may otherwise occur due to the relative motion between the innermost layer of the laminated metallic belt and the corresponding surfaces of the metallic blocks.

It is also effective to combine the iron nitriding process and the electroless plating process in improving the durability of the laminated metallic belt. This can be accomplished by first conducting a nitriding process and then conducting the electroless plating. Since the oxide layer which will be formed on the nitride layer is extremely hard, the preparation of the surface for the electroless plating must be carefully performed.

According to one experiment conducted by the inventors, a laminated metallic belt provided with the nitride layer along the lateral side edges thereof according to the present invention was passed around a pair of pulleys each having an effective radius of 30 mm, and a tensile force of 500 to 1,000 kg was applied between the two pulleys. After 400 hours of operation, the laminated metallic belt of the present invention suffered very little wear while a similar conventional laminated metallic belt without such a hardened surface showed 1.0 to 2.0 mm of wear after the same time period under the same conditions.

Although the present invention has been shown and described with reference to the preferred embodiment thereof, it should not be considered as limited thereby. Various possible modifications and alterations could be conceived of by one skilled in the art to any particular embodiment, without departing from the scope of the invention.

What we claim is:

1. A laminated metallic belt consisting of a plurality of layers of endless metallic band and having an innermost surface defined by the innermost layer of endless metallic band, an outermost surface defined by the outermost layer of endless metallic band, and side edges formed by the side edges of the endless metallic bands, for use in a torque transmission device in combination with a plurality of metallic blocks contacting the innermost surface of the laminated metallic belt and arranged along the laminated metallic belt, wherein:
   at least the side edges of each endless metallic band are hardened.

2. A laminated metallic belt for a torque transmission device as defined in claim 1, wherein each endless metallic band consists of a material selected from precipitation hardening martensitic stainless steel and maraging steel.

3. A laminated metallic belt for a torque transmission device as defined in claim 1 or 2, wherein a nitride layer is formed on the side edges of each endless metallic band.

4. A laminated metallic belt for a torque transmission device as defined in claim 1 or 2, wherein an electroless nickel plating layer is formed on the side edges of each endless metallic band.

5. A laminated metallic belt for a torque transmission device as defined in claim 1 or 2, wherein a nitride layer and an electroless nickel plating layer are formed on the side edges of each endless metallic band.

6. A laminated metallic belt for a torque transmission device as defined in claim 1, wherein the innermost surface of the laminated metallic belt is also surface hardened.

7. A laminated metallic belt for a torque transmission device as defined in claim 6, wherein the outermost surface of the laminated metallic belt is also surface hardened.

8. A laminated metallic belt for a torque transmission device as defined in claim 6 or 7, wherein the surface hardening consists of a nitride layer.

9. A laminated metallic belt for a torque transmission device as defined in claim 6 or 7, wherein the surface hardening consists of an electroless nickel plating.

10. A laminated metallic belt for a torque transmission device as defined in claim 6 or 7, wherein the surface hardening consists of both a nitride layer and an electroless nickel plating.

11. A method of manufacturing a laminated metallic belt for use in a torque transmission device in combination with a plurality of metallic blocks, comprising the steps of:
   laminating a plurality of metallic band layers to form a belt having an innermost surface defined by the innermost metallic band layer, an outermost surface defined by the outermost metallic band layer, and lateral side edges defined by the side edges of the metallic band layers; and forming a nitride layer over the lateral side edges of the metallic band layers.

12. A method of manufacturing a laminated metallic belt for a torque transmission device as defined in claim 11, wherein the step of forming the nitride layer comprises the step of implanting nitrogen ions onto the side edges of the metallic band layers substantially in a vacuum environment.

13. A method of manufacturing a laminated metallic belt for a torque transmission device as defined in claim 12, further comprising the step of clamping shield material onto the outermost surface and the innermost surface of the metallic band layers before implanting nitrogen ions on the exposed side edges of the metallic band layers.

14. A method of manufacturing a laminated metallic belt for a torque transmission device as defined in claim 13, further comprising the step of forming a nitride layer on the innermost surface and/or the outermost surface of the laminated metallic belt before forming the nitride layer along the side edges of the metallic band layers.

15. A method of manufacturing a laminated metallic belt for use in a torque transmission device in combination with a plurality of metallic blocks, comprising the steps of:

laminating a plurality of metallic band layers to form a belt having an innermost surface formed by the innermost metallic band layer, an outermost surface defined by the outermost metallic band layer, and lateral side edges defined by the side edges of the metallic band layers; and conducting an electroless nickel plating on the lateral side edges of the metallic band layers.

16. A method of manufacturing a laminated metallic belt for a torque transmission device as defined in claim 15, wherein a nitride layer is formed along the side edges of the metallic band layers before the electroless nickel plating is conducted on the metallic band layers.

* * * * *